(12) United States Patent
Hayashi et al.

(10) Patent No.: US 6,836,713 B2
(45) Date of Patent: Dec. 28, 2004

(54) NAVIGATIONAL METHOD AND DEVICE FOR USER INTERFACE FOR MOTOR VEHICLES

(75) Inventors: Toshiaki Hayashi, Uraysu (JP); Robert S. Murdock, Oakland, CA (US); Norio Fujikawa, San Francisco, CA (US); Ron M. Kurti, San Francisco, CA (US)

(73) Assignee: Coato Workshop, Inc., Tokyo (JP)

( * ) Notice: Subject to any disclaimer, the term of this patent is extended or adjusted under 35 U.S.C. 154(b) by 70 days.

(21) Appl. No.: 10/417,816

(22) Filed: Apr. 16, 2003

(65) Prior Publication Data

US 2004/0199309 A1 Oct. 7, 2004

Related U.S. Application Data

(60) Provisional application No. 60/460,491, filed on Apr. 3, 2003.

(51) Int. Cl.[7] .................................................. G06F 7/00
(52) U.S. Cl. .......................................... 701/36; 345/700
(58) Field of Search .............................. 701/1, 36, 207, 701/208, 209, 210, 211, 212; 345/700, 702, 716, 828, 829, 831

(56) References Cited

U.S. PATENT DOCUMENTS

| | | | |
|---|---|---|---|
| 6,012,014 A | 1/2000 | Koyanagi et al. | |
| 6,046,688 A | 4/2000 | Higashikata et al. | |
| 6,175,802 B1 | 1/2001 | Okude et al. | |
| 6,252,579 B1 * | 6/2001 | Rosenberg et al. | 345/856 |
| 6,278,383 B1 | 8/2001 | Endo et al. | |
| 6,285,317 B1 | 9/2001 | Ong | |
| 6,288,705 B1 * | 9/2001 | Rosenberg et al. | 345/163 |
| 6,289,278 B1 | 9/2001 | Endo et al. | |
| 6,693,622 B1 * | 2/2004 | Shahoian et al. | 345/156 |
| 6,762,745 B1 * | 7/2004 | Braun et al. | 345/156 |

* cited by examiner

*Primary Examiner*—Richard M. Camby
(74) *Attorney, Agent, or Firm*—Townsend and Townsend and Crew, LLP

(57) ABSTRACT

An apparatus for navigating through one of a plurality of panels on a display in a moving vehicle. The apparatus includes a display coupled to a processing device and memory. The display faces a user of a motorized vehicle. The apparatus also includes a graphical user interface on the display, which comprises a plurality of panels numbered from 1 through N, where N is an integer greater than 2. A selector device is coupled to the graphical user interface through the processing device. The selector device is within a vicinity of a user of the motorized vehicle. The selector device is adapted to display any one or more of the plurality of panels from the first panel numbered 1 through the Nth panel numbered N by moving the selector device in a first direction. The selector device is also adapted to select one of the panels being displayed by moving the selector device in a second direction.

25 Claims, 8 Drawing Sheets

NAVIGATIONAL METHOD AND DEVICE FOR USER INTERFACE FOR MOTOR VEHICLES

CROSS-REFERENCES TO RELATED APPLICATIONS

This present application is related to U.S. Ser. No. 09/976,184 filed Oct. 12, 2001 and claims the benefit of U.S. Provisional Application No. 60/460,491 filed Apr. 3, 2003, commonly assigned, and hereby incorporated by reference for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates generally to improved instrumentation for motor vehicles. In particular, the invention provides an apparatus and method for an improved user interface for a computer instrumentation display for an automobile. More particularly, the invention provides an apparatus and method for an improved display and user interface for navigating through one or more panels on a graphical user interface device. Merely by way of example, the invention is applied to an interior steering wheel of an automobile, but it would be recognized that the invention has a much broader range of applicability.

In the early days, automotive technologies were fairly crude but effective. Germany's Karl Benz has been recognized with a three wheeled automobile be produced in 1886 as one of the first. Such automobile included an engine that was placed over its rear axle. The engine was a horizontal, four-cycle, single-cylinder type. Horsepower was limiting. Here, the engine produced about 1 horsepower. Belts and chains harnessed such power to rear wheels. A top speed of about 15 km/h could be produced. Mechanical technologies such as a lever connected to a rack-and-pinion controlled a single front wheel to steer the automobile. In the early 1900's, Ford produced a very popular automobile called "The Model T." The Model T had technologies that spread motorization. Such technologies included various mechanisms for easy driving. Examples of such mechanisms included a planetary gear transmission. Most particularly, the Model T was produced in mass production, which provided a low price to allow many people to purchase and enjoy the Model T. More than 15,000,000 units were built from 1908 to 1927, which revolutionized the automotive industry.

Many limitations exist with such early automobiles. For example, they lacked power and had numerous mechanical problems. Such problems have been addressed with many of today's conventional automobiles. These conventional automobiles such as those manufactured by Nissan Motor Company and others have horsepower greater than two hundred. Additionally, such automobiles include a wide variety of other features such as automatic windows, power steering, and even microprocessor controls. Often times, visual displays for monitoring certain devices on automobiles have also progressed. These displays include speedometers, tachometers, temperature gauges, and the like. Displays began as mechanical devices including rotating dial members. The dials often pointed to a number that represented temperature, engine RPM, speed, and other parameters. Although the automobile has improved, such displays have been used for a long time on automobiles without significant improvement. These automobiles are also coming equipped with onboard computers. Such computers are used to operate certain features of the automobile. Unfortunately, there is no easy way of accessing such computers by the user in a safe and efficient manner.

From the above, it is seen that techniques for improved control of automobiles is desired.

BRIEF SUMMARY OF THE INVENTION

According to the present invention, an improved instrumentation for motor vehicles is provided. In particular, the invention provides an apparatus and method for an improved user interface for a computer instrumentation display for an automobile. More particularly, the invention provides an apparatus and method for an improved display and user interface for navigating through one or more panels on a graphical user interface device. Merely by way of example, the invention is applied to an interior steering wheel of an automobile, but it would be recognized that the invention has a much broader range of applicability.

In a specific embodiment, the invention provides an apparatus for navigating through one of a plurality of panels on a display in a moving vehicle. The apparatus includes a display coupled to a processing device and memory. The display faces a user of a motorized vehicle. The apparatus also includes a graphical user interface on the display, which comprises a plurality of panels (or portion of panels) numbered from 1 through N, where N is an integer greater than 2. Depending upon the embodiment, the panel can be an electronic page or portion of a user interface or any combination of these. A mechanical selector device is coupled to the graphical user interface through the processing device. The selector device is within a vicinity of a user of the motorized vehicle. Preferably, the selector device is provided on a steering wheel of the automobile. The selector device is adapted to display any one or more of the plurality of panels from the first panel numbered 1 through the Nth panel numbered N by moving the selector device in a first direction. The selector device is also adapted to select one of the panels being displayed by moving the selector device in a second direction.

In an alternative specific embodiment, the invention provides a method for navigating through a computer interface on a motorized vehicle. The method includes moving an actuator within a vicinity of a user of the motorized vehicle in a first direction to output a graphical user interface on a display from a first panel from a plurality of panels numbered from 1 through N, where N is an integer greater than 2, to a second panel. The method also includes selecting one of the panels being displayed by moving the actuator in a second direction.

In an alternative specific embodiment, the invention provides a method for navigating through a computer interface on a motorized vehicle. The method includes holding an outer portion of a steering wheel assembly using at least one hand of a user to navigate a vehicle coupled to the steering wheel assembly. The method also moves an actuator device coupled to an inner spatial region of the steering wheel assembly in a first direction a first direction to navigate a graphical user interface on a display coupled to a dash board of the vehicle while maintaining the steering wheel assembly using the one hand on the outer portion of the steering wheel assembly. The method also moves the actuator device in a second direction to navigate through the graphical user interface while also maintaining the steering wheel assembly using the one hand on the portion of the steering wheel assembly. The actuator device is provided to navigate through a computer user interface, which is on the dash of the motorized vehicle. Further details are provided throughout the present specification and more particularly below.

Numerous benefits are achieved using the present invention over conventional techniques. In a specific embodiment, the present invention provides a mechanical interface to a display for a moving vehicle. The mechanical interface is coupled to a steering wheel, which is easy to access, according to other embodiments. Preferably, the invention provides a safe and easy way of navigating through one of a plurality of panels or other user interface device elements. The invention can also be implemented using conventional hardware and software technologies. Depending upon the embodiment, one or more of these benefits or features can be achieved. These and other benefits are described throughout the present specification and more particularly below.

The accompanying drawings, which are incorporated in and form part of the specification, illustrate embodiments of the invention and, together with the description, serve to explain the principles of the invention.

DETAILED DESCRIPTION OF THE INVENTION

According to the present invention, an improved instrumentation for motor vehicles is provided. In particular, the invention provides an apparatus and method for an improved user interface for a computer instrumentation display for an automobile. More particularly, the invention provides an apparatus and method for an improved display and user interface for navigating through one or more panels on a graphical user interface device. Merely by way of example, the invention is applied to an interior steering wheel of an automobile, but it would be recognized that the invention has a much broader range of applicability.

Figure 1:
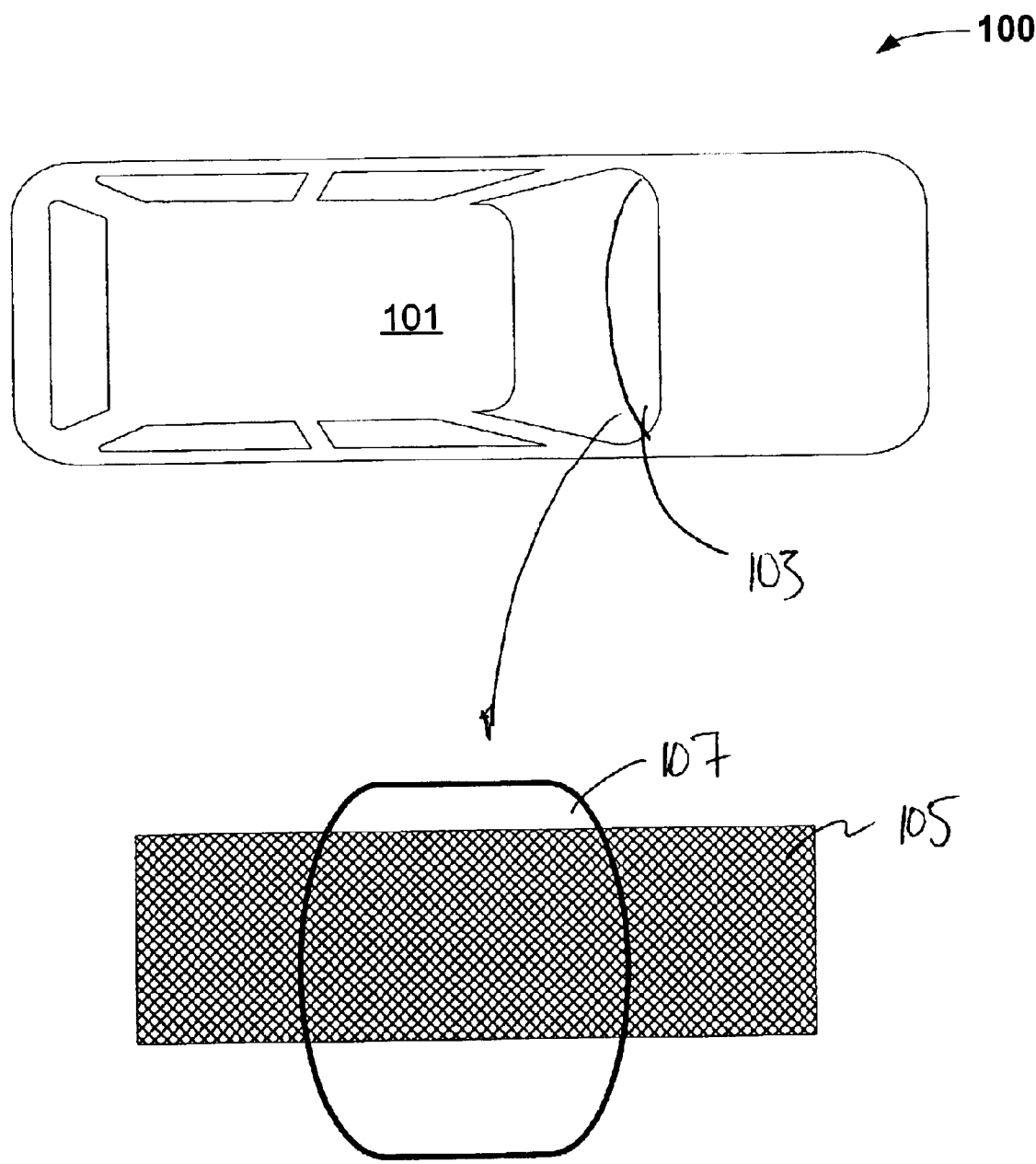
FIG. 1 is a simplified diagram of an automobile according to an embodiment of the present invention.

FIG. 1 is a simplified diagram 100 of an automobile according to an embodiment of the present invention. This diagram is merely an example, which should not unduly limit the scope of the claims herein. One of ordinary skill in the art would recognize many other variations, modifications, and alternatives. As shown, the automobile 101 is illustrated. The automobile includes a dash board 103, which includes instrumentation. The dash board includes display 105, which faces a user. The display is also coupled to steering wheel 107, which moves wheels to steer the automobile any one of a variety of directions. The display includes a plurality of electronic panels, which can be used to display one or more of a variety of computer based functions associated with the automobile or other user elements. A computer (not shown) is also included. The computer is coupled to the display. Although the above has been described in terms of an automobile, the display can also be applied to a motorcycle, farm or construction vehicle, emergency vehicle, military vehicle, trucks, and the like. Details of a novel display and method are described throughout the present specification and more particularly below.

Figure 2:
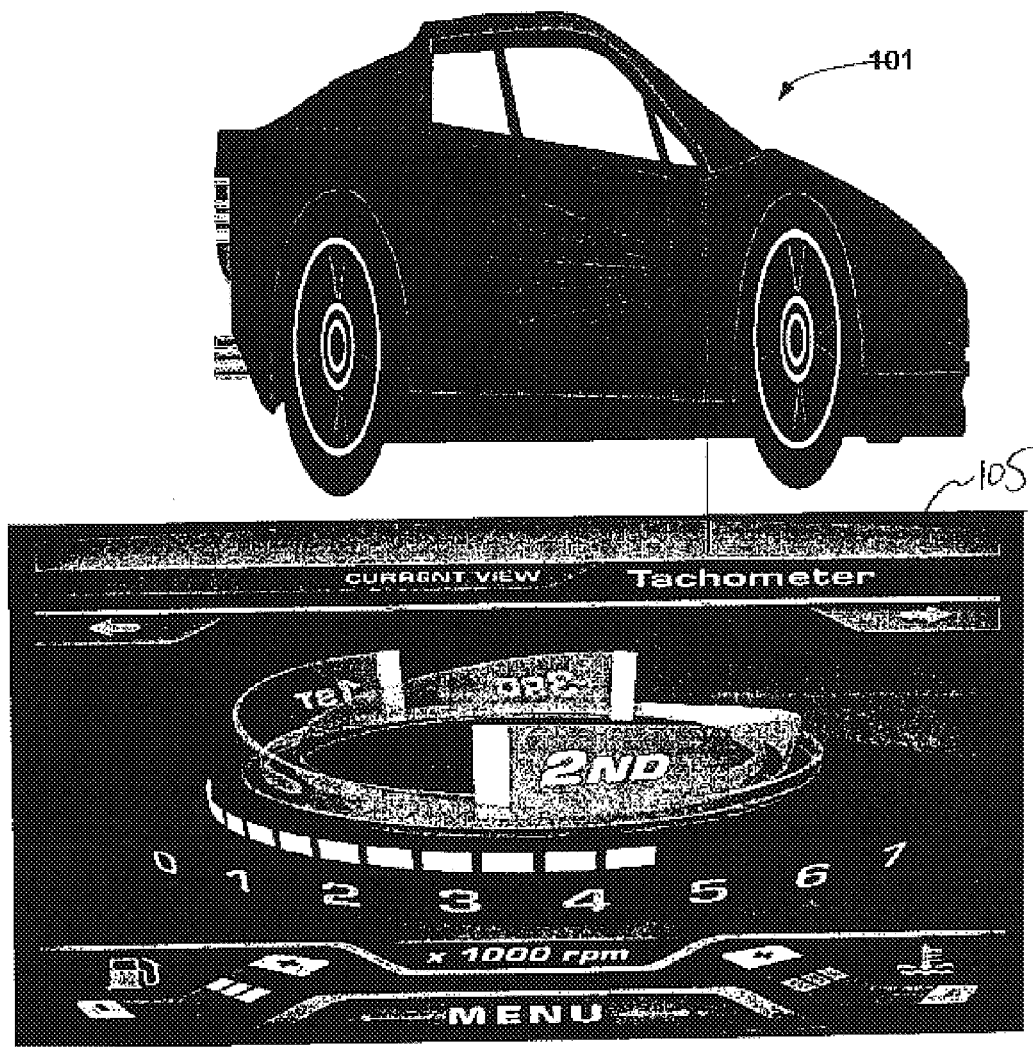
FIG. 2 is a simplified diagram of an automobile including a display according to an embodiment of the present invention.

FIG. 2 is a simplified diagram of an automobile 101 according to an embodiment of the present invention. This diagram is merely an example, which should not unduly limit the scope of the claims herein. One of ordinary skill in the art would recognize many other variations, modifications, and alternatives. As shown, the automobile 101 has a graphical user interface 105 including a novel display design. As merely an example, the display is a speedometer. Such speedometer design faces a driver of the automobile. Preferably, the speedometer is provided in an internal dash board of the automobile. The dashboard may also include other instrumentation. The speedometer display is one of a plurality of panels, which can be outputted on the present display. Depending upon the embodiment, any one of the panels can be displayed by itself or with other panels. Further details of the graphical user interface including methods are described throughout the present specification and more particularly below.

Figure 3:
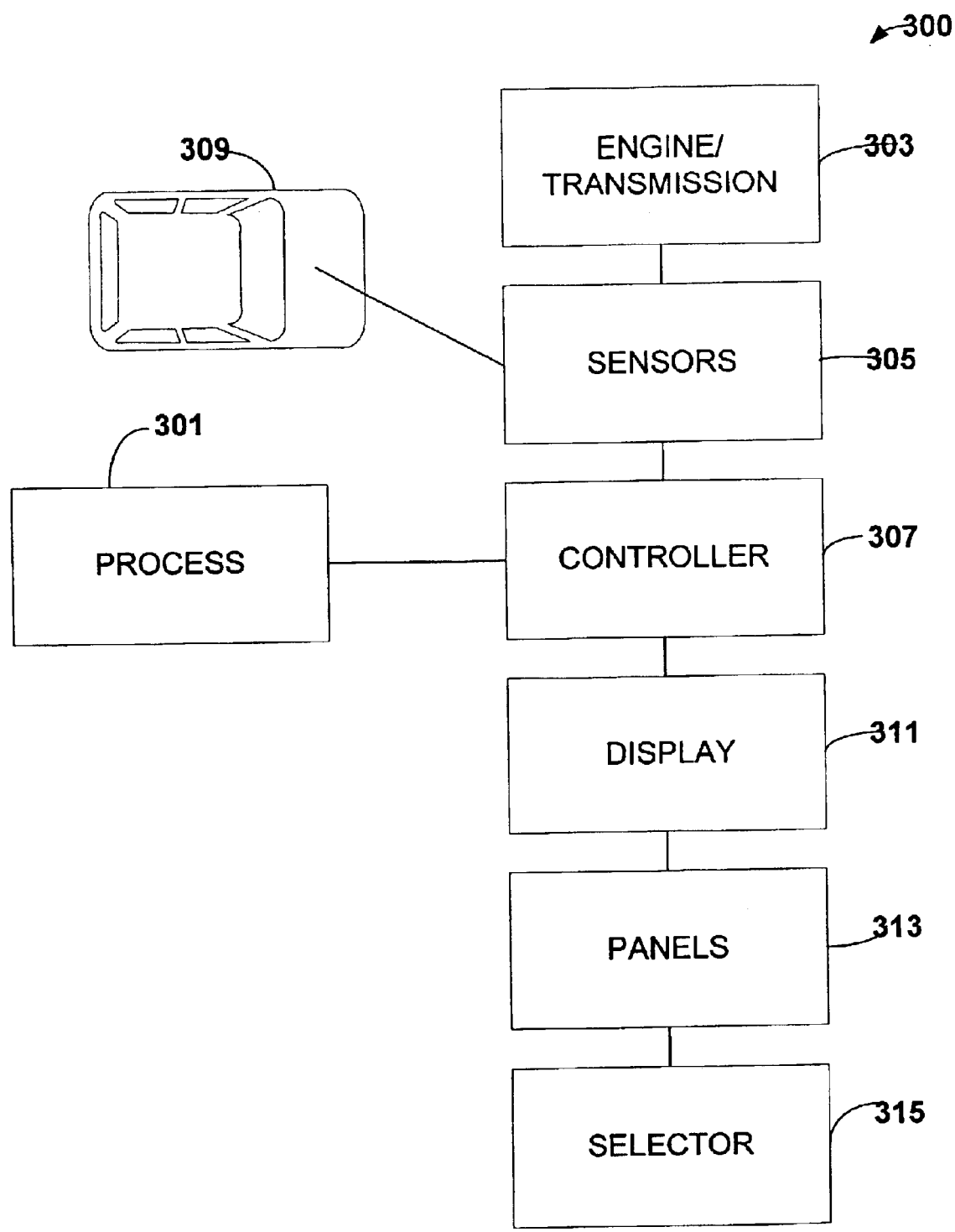
FIG. 3 is a simplified block diagram of an automotive system according to an embodiment of the present invention.

FIG. 3 is a simplified block diagram of an automotive system 300 according to an embodiment of the present invention. This diagram is merely an example, which should not unduly, limit the scope of the claims herein. One of ordinary skill in the art would recognize many other variations, modifications, and alternatives. As shown, a motor vehicle 309 includes an engine 303 and transmission, and an engine monitor gauge (e.g., tachometer, speedometer, temperature, oil pressure, water pressure), which determines and indicates an engine parameter to the driver of the automobile. Depending upon the embodiment, there can be many types of engines and transmissions. The vehicle also includes controller 307, which is in the form of hardware and software. The vehicle includes a display 311. The display can be of any suitable type such as a CRT screen, an LED screen, a LCD screen, an analog or digital meter or gauge, or the like, which can suitably display digital and/or analog information. Depending upon the embodiment, there can be many other modifications, alternatives, and variations.

In a specific embodiment, the display outputs one of a plurality of panels 313 and/or more than one of the panels simultaneously. Each of the panels is selectable using a selector device 315, which is provided within a vicinity of a user of the automobile. The automobile also includes a user interface process 301, which oversees functionality of the automobile. Depending upon the embodiment, the panels can be related to functions of the automobile, mapping functions, news and/or information functions, or the like.

Further details of the graphical user interface including methods are described throughout the present specification and more particularly below.

Figure 4:
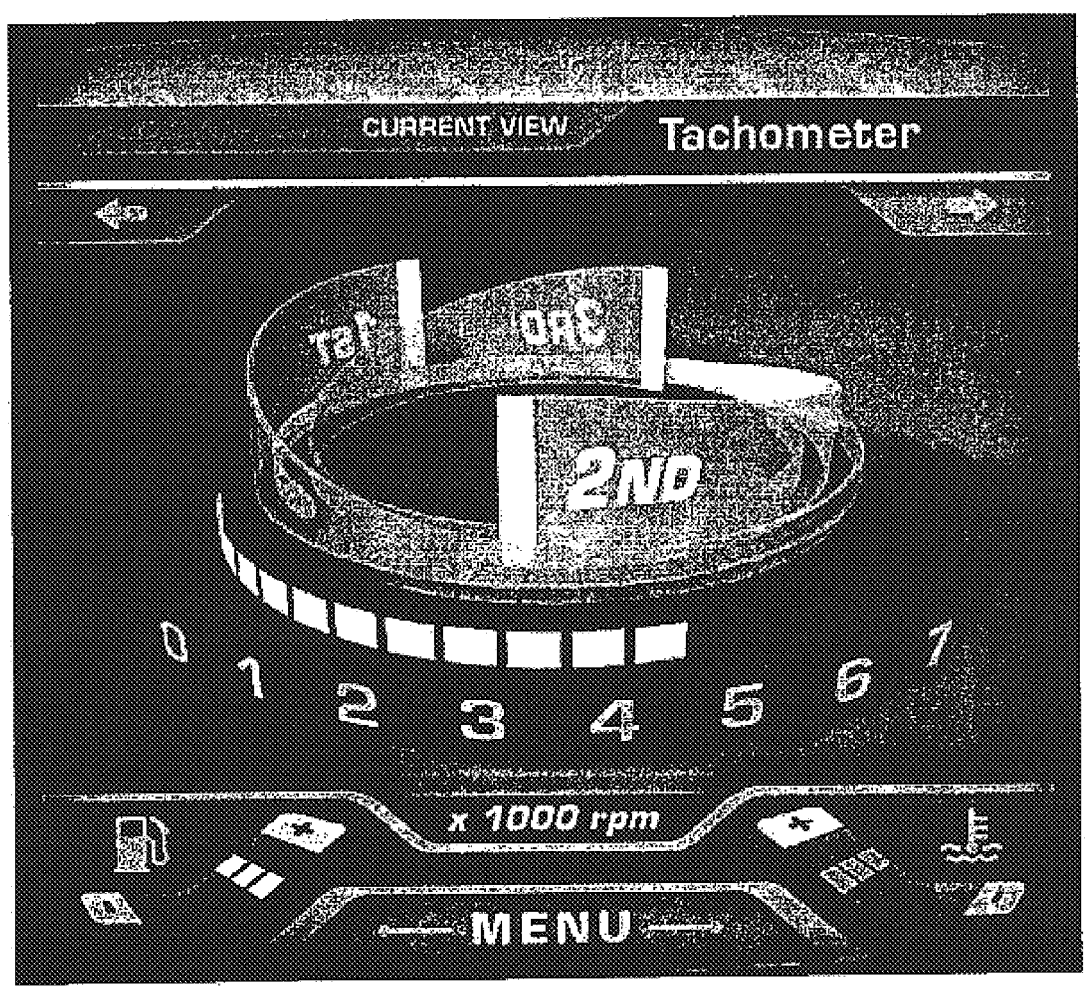
FIG. 4 is a simplified diagram of a display according to an embodiment of the present invention.

FIG. 4 is a simplified diagram of a graphical user display 400 for a tachometer according to an embodiment of the present invention. This diagram is merely an example, which should not unduly limit the scope of the claims herein. One of ordinary skill in the art would recognize many other variations, modifications, and alternatives. As shown, the user display includes a tachometer 400. The tachometer display is a panel, which is one of a plurality of panels, which can be displayed simultaneously or by itself. Each of the panels is stored in memory and retrieved via user interface process. Further details of the present hardware system is illustrated by FIG. 5.

Figure 5:
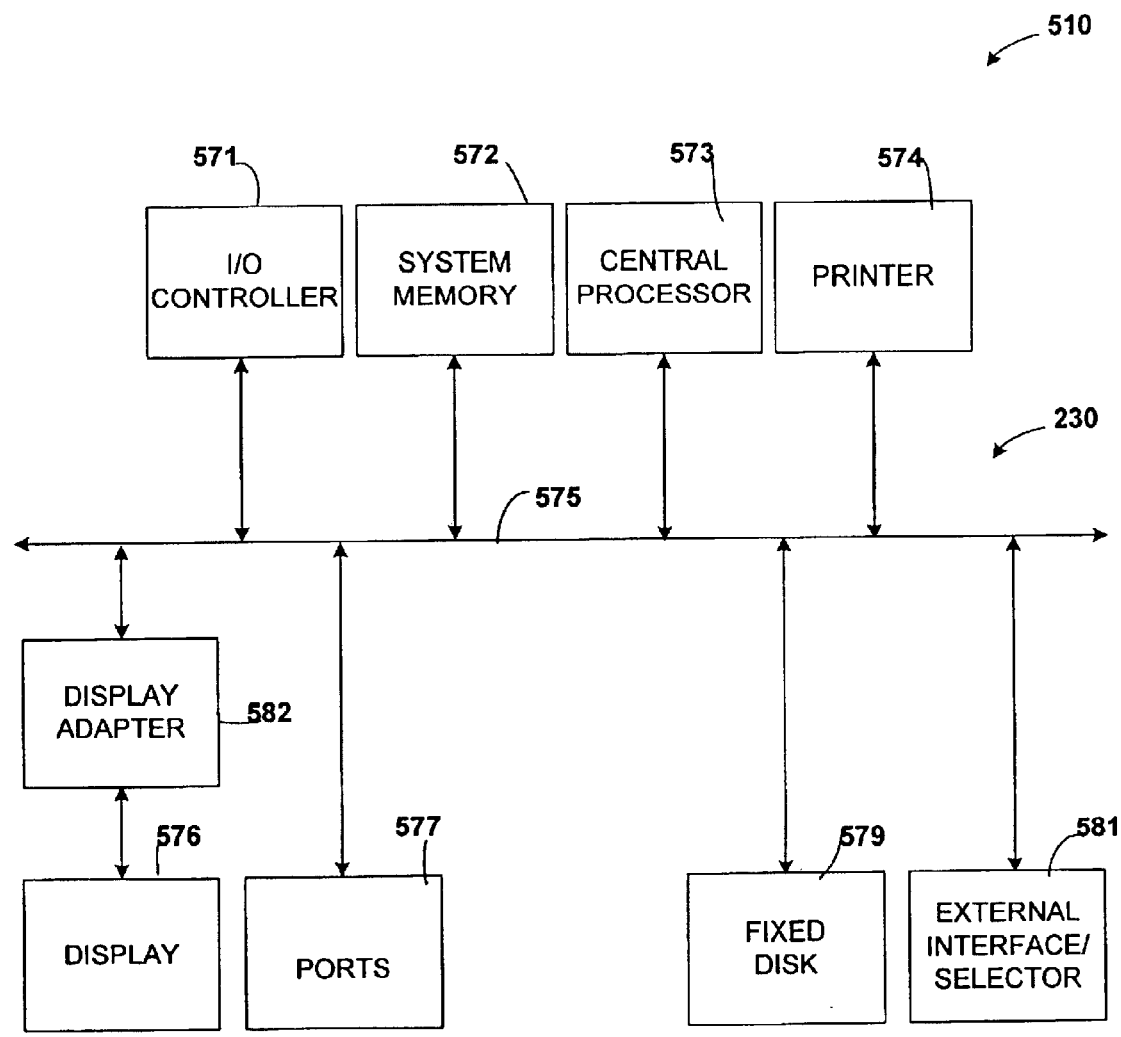
FIG. 5 is a simplified block diagram of a system diagram for an automobile according to an embodiment of the present invention.

As shown in FIG. 5, computing system 510 preferably includes familiar components such as processor 573, and memory storage devices 572, such as a random access memory (RAM), a fixed disk drive 579, and a system bus 575 interconnecting the above components. The system can also include printer 574, I/O controller 571, display adapter 582, and input/output ports 577. The user input device 581 preferably includes a selector, which will be described in more detail below. The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

Figure 6:
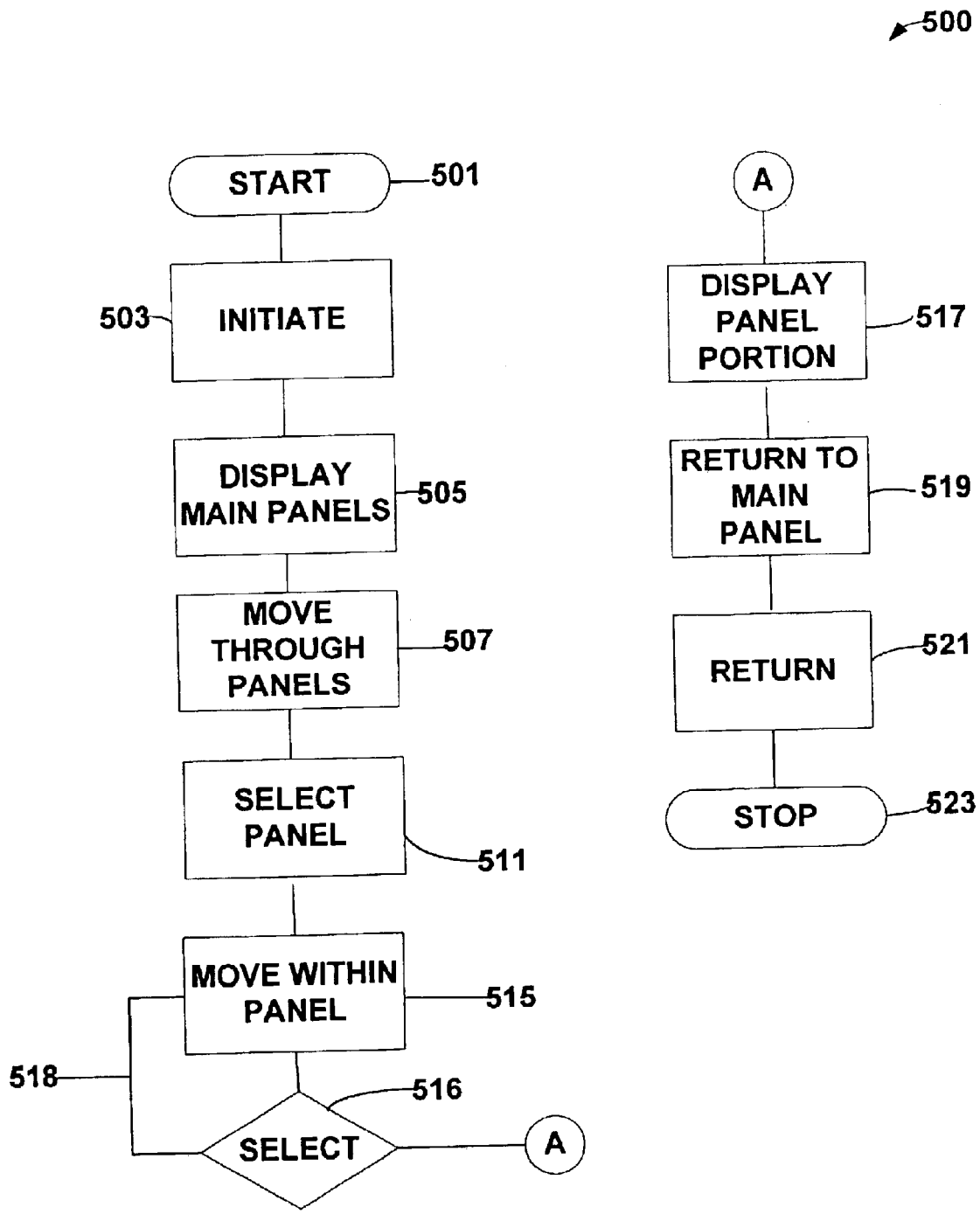
FIG. 6 is a simplified diagram of a method according to an embodiment of the present invention.

FIG. 6 is a simplified diagram of a method 500 according to an embodiment of the present invention. This diagram is merely an example, which should not unduly limit the scope of the claims herein. One of ordinary skill in the art would recognize many other variations, modifications, and alternatives. As shown, the method begins at start, step 501, which is a method for navigating through a computer interface on a motorized vehicle. The method begins with an initiation process, step 503. Depending upon the embodiment, the initiation process can be sending a control signal to a processor to begin the process to display one of the plurality of panels, which are provided on the display. In a specific embodiment, the initiation process begins when a user inserts a code to start or open the motorized vehicle. Here, the user may insert the code manually into a user interface such as a touch pad. Alternatively, the user inserts a specialized key, which includes the code. The code is transferred from the user to the processor, which selects a predetermined sequence of panels according to a specific embodiment.

Once one set of panels have been selected, the method displays (step 505) one of the main panels, which relate to a navigation process. The method includes moving an actuator within a vicinity of a user of the motorized vehicle in a first direction to output a graphical user interface on a display from a first panel from a plurality of panels numbered from 1 through N, where N is an integer greater than 2, to a second panel. Here, the method moves from any one of the panels to another panel, step 507.

Figure 7:
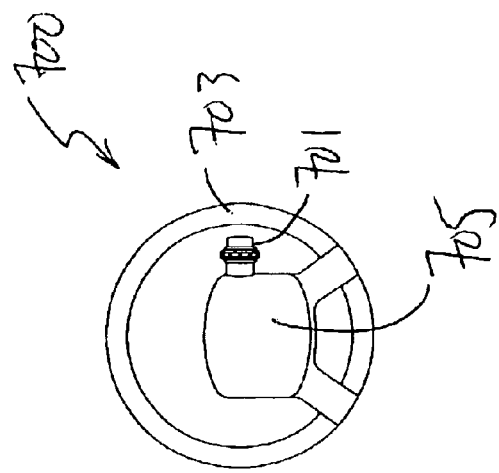
FIG. 7 is a simplified diagram of a selector device according to an embodiment of the present invention.
Figure 7:
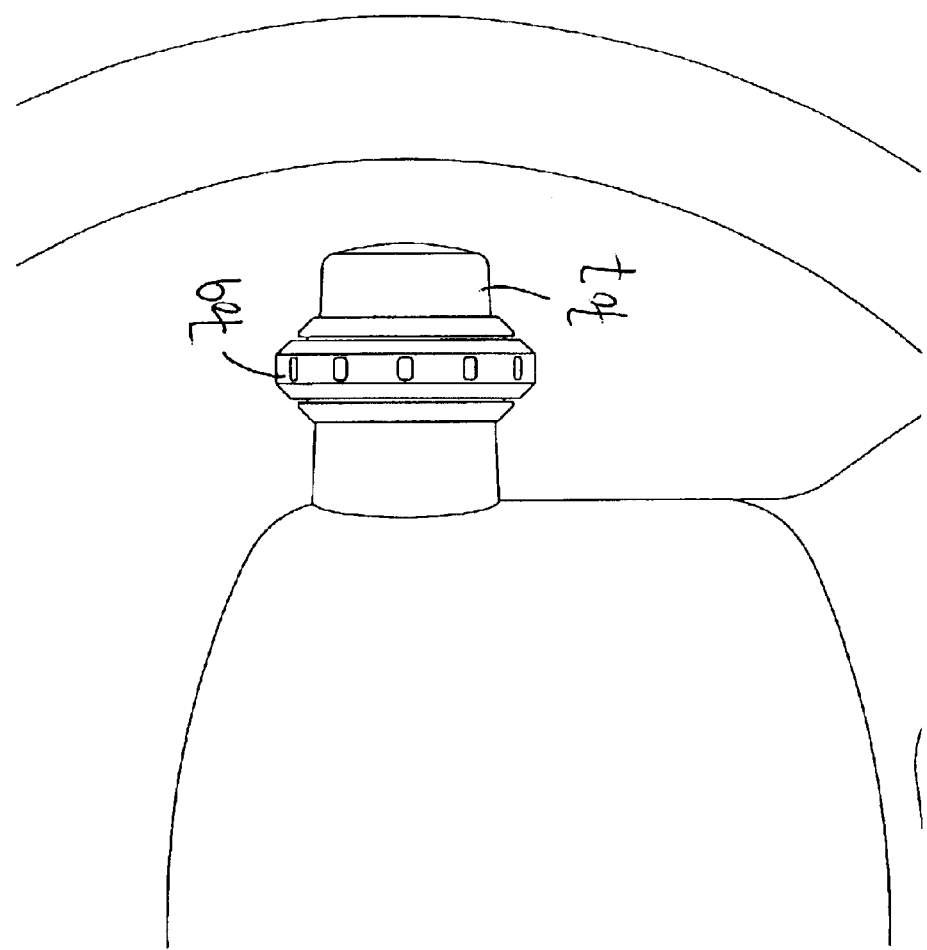

As merely an example, the user moves through the panels by turning a selector device 701, which is coupled between an outer portion 703 of a steering wheel and an inner portion 705 of the steering wheel, as illustrated by the simplified diagram of FIG. 7. This diagram is merely an example, which should not unduly limit the scope of the claims herein. One of ordinary skill in the art would recognize many variations, alternatives, and modifications. As shown, the selector device includes is within a vicinity of a user of the motorized vehicle via steering wheel. The selector device can be accessed using a thumb and fingers of a user, while holding the steering wheel. The selector device includes a first member 709, which is rotatable about an axis. The rotatable member can be turned using the thumb and finger while the driver holds the steering wheel with the palm portion of the hand to turn through one or more of the plurality of panels starting from the first panel numbered 1 through the Nth panel numbered N by moving the selector device in a first direction and/or a direction opposite of the first direction. Preferably, the selector is a push button type, which is moved in one direction and actuates back in the opposite direction to a home position.

Figure 8:
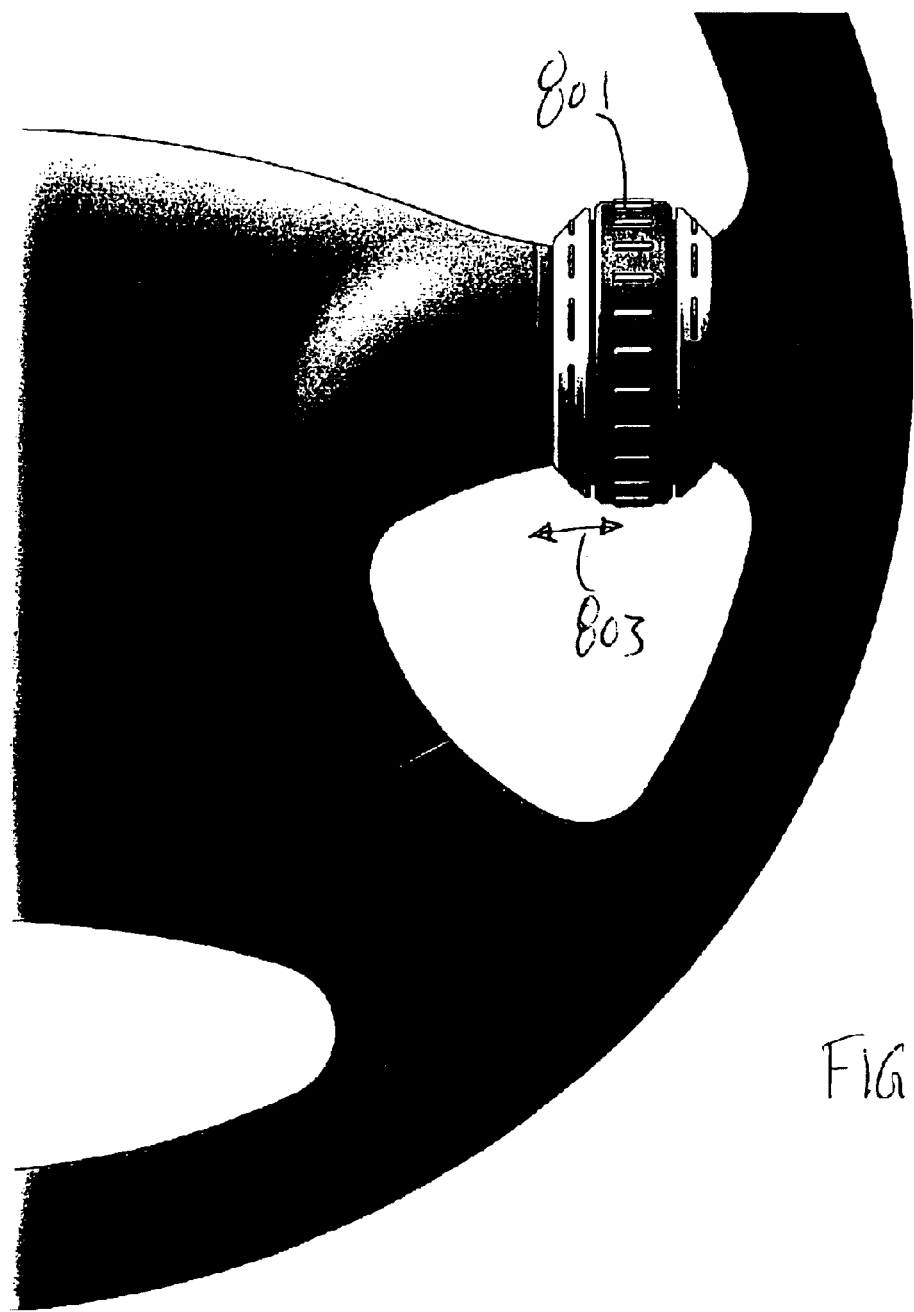
FIG. 8 is a simplified diagram of an alternative device according to an embodiment of the present invention.

The method also includes selecting (step 511) one of the panels being displayed by moving the actuator in a second direction. Again referring to FIG. 7, selector device includes member 707, which can be depressed to select the panel to be displayed. The member can also be used to select other items, which are displayed. An alternative selector device is illustrated in FIG. 8. Here, the selector device includes rotatable member 801, which rotates about an axis parallel to the plane of the steering wheel. The rotatable member can be depressed 803 or moved toward the inner portion of the steering wheel or pulled or moved toward the outer portion of the steering wheel using the thumb and fingers of the user. Here, the user can make such selection while holding the steering wheel with a portion of the user's palm and inner portion of the fingers in preferred embodiments.

Referring back to FIG. 5, the method includes moving a cursor within a portion of the panel. The cursor can be moved using the selector device or other like device, which is within a vicinity of the user. The method moves the cursor until selection (step 516) is provided. Otherwise, the method continues to move the cursor within the panel via branch 518. Once the selection has been made, the method displays a portion of the selected panel 517. Alternatively, the method can return to one of the main plurality of panels step 519. The method can continue to flip through one of the plurality of panels and/or return via step 521 depending upon the embodiment. The method stops at step 523, depending upon the embodiment.

The above figures describe aspects of the invention illustrated by elements in simplified system and method diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. These and other variations, modifications, and alternatives will be apparent by one of ordinary skill in the art.

While the invention is described in conjunction with the preferred embodiments, this description is not intended in any way as a limitation to the scope of the invention. Modifications, changes, and variations, which are apparent to those skilled in the art can be made in the arrangement, operation and details of construction of the invention disclosed herein without departing from the spirit and scope of the invention.

What is claimed is:

1. A method for navigating through a computer interface on a motorized vehicle, the method comprising:

moving an actuator within a vicinity of a user of the motorized vehicle in a first direction to output a graphical user interface on a display from a first panel from a plurality of panels numbered from 1 through N, where N is an integer greater than 2, to a second panel; and selecting one of the panels being displayed by moving the actuator in a second direction.

2. The method of claim 1 wherein the actuator is coupled to a steering wheel or a arm rest of a driver's seat of the motorized vehicle.

3. The method of claim 1 wherein the actuator is within an interior of the motorized vehicle.

4. The method of claim 1 wherein the moving and selecting are provided by at least a thumb of a hand of the user.

5. The method of claim 1 wherein each of the panel's includes a plurality of third panels.

6. The method of claim 1 wherein the plurality of panels are provided on computer software, the computer software being overseen by a microprocessor device, the microprocessor device having a characteristic speed of greater than about 1 GHz.

7. The method of claim 1 wherein the plurality of panels are configured for a predefined user.

8. The method of claim 7 wherein the predefined user is provided by an identification code.

9. The method of claim 8 wherein the identification code is provided by a key.

10. The method of claim 1 wherein the actuator comprises a rotatable member coupled to a selection member, the rotatable member being operable in the first direction and the selection member being operable in the second direction.

11. The method of claim 1 wherein the rotatable member is an annular member, the annular member being adapted to move in a rotational manner about the first direction.

12. The method of claim 1 wherein the actuator is coupled between an outer portion of a steering wheel and an inner portion of the steering wheel.

13. The method of claim 1 wherein each of the panels being representative of a theme.

14. The method of claim 1 wherein the theme is selected from vehicle navigation, vehicle performance, or vehicle entertainment.

15. The method of claim 1 wherein the display comprises a flat panel display.

16. The method of claim 1 further comprising outputting the selected panel while not outputting the other panels on the display.

17. The method of claim 1 further comprising outputting the selected panel while outputting at least one other panel on the display.

18. The method of claim 1 wherein the plurality of panels numbered from 1 through N are stored in memory in electronic form, the selected panel being retrieved from the memory.

19. An apparatus for navigating through one of a plurality of panels on a display in a moving vehicle, the apparatus comprising:

a display coupled to a processing device and memory, the display being configured to face a user of a motorized vehicle;

a graphical user interface on the display, the graphical user interface comprising a plurality of panels numbered from 1 through N, where N is an integer greater than 2;

a selector device coupled to the graphical user interface through the processing device, the selector device being within a vicinity of a user of the motorized vehicle, the selector device being adapted to display any one or more of the plurality of panels from the first panel numbered 1 through the Nth panel numbered N by moving the selector device in a first direction;

wherein the selector device is also adapted to select one of the panels being displayed by moving the selector device in a second direction.

20. The apparatus of claim 19 wherein the selector device is coupled to a steering wheel, the selector device including a first member coupled to a second member, the first member being adapted to be movable in the first direction, the second member being adaptable to be movable in the second direction.

21. The method of claim 20 wherein the second member including a spring device, the spring device being adapted to return the second member in a direction opposite of the second direction upon release by the user.

22. The method of claim 19 wherein the selector device is coupled between an outer portion of a steering wheel and an inner portion of the steering wheel.

23. A method for navigating through a computer interface on a motorized vehicle, the method comprising:

holding an outer portion of a steering wheel assembly using at least one hand of a user to navigate a vehicle coupled to the steering wheel assembly;

moving an actuator device coupled to an inner spatial region of the steering wheel assembly in a first direction a first direction to navigate a graphical user interface on a display coupled to a dash board of the vehicle while maintaining the steering wheel assembly using the one hand on the outer portion of the steering wheel assembly; and moving the actuator device in a second direction to navigate through the graphical user interface while also maintaining the steering wheel assembly using the one hand on the portion of the steering wheel assembly.

24. The method of claim 23 wherein the first direction is normal to the second direction, the first direction is toward a center region of the steering wheel assembly.

25. The method of claim 1 wherein the actuator device comprises a rotatable member coupled to a push button selector, the rotatable member being operable in the second direction and the push button selector being operable in the first direction.

* * * * *